3,060,214
PRODUCTION OF ORGANOMETALLIC COMPOUNDS OF NICKEL

Hans Cordes, Ludwigshafen (Rhine), Germany, assignor to Badische Anilin- & Soda-Fabrik Aktiengesellschaft, Ludwigshafen (Rhine), Germany
No Drawing. Filed Nov. 19, 1958, Ser. No. 774,853
Claims priority, application Germany Nov. 23, 1957
5 Claims. (Cl. 260—439)

This invention relates to the production of organometallic compounds of nickel.

It is known to prepare, from a number of transitional metals or their compounds, organometallic compounds in which the cyclopentadienyl radical and carbon monoxide are linked to the transitional metal. The recovery of the corresponding organometallic compounds of nickel, however, is attended by difficulty so that it has hitherto been assumed that organometallic compounds of nickel with a cyclopentadienyl radical and carbon monoxide in the molecule are not stable.

I have now found that compounds of nickel which contain in the molecule both the cyclopentadienyl radical and carbon monoxide can be prepared in a simple way and in good yields by reacting nickel tetracarbonyl with a cyclopentadienyl alkali compound.

Suitable alkali compounds include cyclopentadienyl sodium, cyclopentadienyl potassium and cyclopentadienyl lithium. The alkali compounds of substituted cyclopentadienes, such as alkyl or aryl substituted cyclopentadienes, may also be used with good results.

Preferred cyclopentadienyl derivatives are the methyl, ethyl and other lower alkyl cyclopentadienyl derivatives.

In general, nickel, tetracarbonyl is reacted with the stoichiometrical amount of cyclopentadienyl alkali compound. In many cases, however, it has proved to be advantageous to use nickel tetracarbonyl in excess, for example in an amount which is 2 or 3 times greater than the stoichiometrical amount.

The reaction between the nickel tetracarbonyl and the said alkali compound is preferably carried out in the presence of an inert solvent. Suitable solvents include aliphatic and cyclic ethers, for example diethyl ether, dibutyl ether, glycol ether, tetrahydrofurane and dioxane, as well as other polar organic compounds, such as alcohols, ketones, monomethylformamide, dimethylformamide and N-methylpyrrolidone. In many cases it is helpful to add a hydrocarbon to the reaction mixture in addition to the solvent, especially aromatic hydrocarbons such as benzene or its homologues.

It is advantageous to use inert solvents in amounts which are 3 to 20 times greater, preferably 5 to 10 times greater than the nickel tetracarbonyl.

Care should be taken in these reactions that no free oxygen is present in the reaction chamber.

Sometimes it is advantageous, in order to increase the yield, to carry out the reaction of nickel tetracarbonyl with cyclopentadienyl sodium or methylcyclopentadienyl sodium in the presence of anhydrous nickel salts, such as nickel chloride, nickel bromide, nickel nitrate or nickel thiocyanate.

The production of the said organometallic nickel compounds according to the invention may be carried out at relatively low temperatures, for example at room temperature. In general however it is preferred to use higher temperatures, for example those between 50° and 150° C. or more, in order to increase the reaction speed. When working without pressure and using tetrahydrofurane as the solvent, it is preferable to work at temperatures closely below the boiling point of the solvent, i.e. about 60° C. However if the reaction is carried out in a solvent under pressure, higher temperatures, for example those of 100°, 150°, 180°, 200° C. or more, may also be used.

For the isolation of the desired organometallic nickel compounds, the solvent used is first separated by distillation. Pure end products may be recovered from the resultant residue either by extraction with a solvent, such as benzene or its homologues, or by sublimation in a high vacuum.

The chemical composition of the nickel compounds obtained according to this invention is dependent on the amounts of initial material used, the reaction conditions, and the nature of the working up of the reaction mixture. From the mixture there may be separated in particular dicyclopentadienyl dinickel dicarbonyl which corresponds to the formula $C_5H_5Ni(CO)_2NiC_5H_5$.

The nickel compounds obtained may be used as catalysts. They are also very well suited for use as antiknock agents for the improvement of fuels.

The following examples will further illustrate this invention but the invention is not restricted to these examples.

Example 1

Cyclopentadienyl sodium is prepared in a 500 milliliter three-necked flask with a reflux condenser from 6 grams of sodium and the stoichiometrically necessary amount of freshly distilled cyclopentadiene while carefully excluding oxygen.

The product thus obtained, which in general is white, is dissolved in 200 milliliters of tetrahydrofurane and 35 milliliters of nickel tetracarbonyl are added. The colorless solution becomes colored deep red. In order to carry the reaction to its end, the mixture is slowly heated while stirring powerfully to 60° to 65° C. and kept at this temperature for about two hours. After cooling, the solvent is distilled off in vacuo with the remainder of the unused nickel tetracarbonyl.

From the residue obtained there is then separated by sublimation in a high vacuum dicyclopentadienyl dinickel dicarbonyl which occurs in deep red crystals. First some dicyclopentadienyl nickel escapes at temperatures up to about 80° C. and then the desired product is deposited on the cooled surface at temperatures above 80° C.

If the dicyclopentadienyl dinickel dicarbonyl obtained is added in an amount of 0.1% by weight to a gasoline having the octane number 40.5, the octane number is raised to 58.5.

Example 2

12 grams of sodium are reacted in 300 milliliters of tetrahydrofurane with the stoichiometrically necessary amount of freshly distilled cyclopentadiene to form cyclopentadienyl sodium. To this solution there are then added 35 grams of anhydrous nickel chloride and 70 milliliters of nickel tetracarbonyl and the whole heated for 3 to 4 hours to the boiling point of the solvent. The product is worked up as in Example 1.

Example 3

Cyclopentadienyl sodium is prepared in 250 milliliters of ammonia from 12 grams of sodium and the stoichiometrically necessary amount of freshly distilled cyclopentadiene. After evaporating the ammonia, the cyclopentadienyl sodium is dissolved in 300 milliliters of tetrahydrofurane and brought into reaction with 75 grams of nickelous hexammine thiocyanate and 70 milliliters of nickel tetracarbonyl, by heating the mixture to the boiling point of the solvent for about 2 hours. Then the solvent is distilled off and the residue extracted with benzene. The benzene is then removed again by distillation. The product thus recovered, consisting in the main of dicyclopentadienyl dinickel dicarbonyl and dicyclopentadienyl nickel, can be separated and purified as in Example 1 by sublimation in high vacuum.

*Example 4*

As in the previous examples, 12 grams of sodium are reacted with the stoichiometrically necessary amount of freshly distilled methylcyclopentadiene. The methylcyclopentadienyl sodium thus formed is dissolved in 300 milliliters of tetrahydrofurane and 70 milliliters of nickel tetracarbonyl are added. While carefully excluding air, the mixture is heated for about two hours to the boiling point of the solvent. Further working up takes place as in Example 1 or 3.

*Example 5*

Methylcyclopentadienyl sodium prepared as in Example 4 from 12 grams of sodium is dissolved in 300 milliliters of tetrahydrofurane and reacted with 35 grams of anhydrous nickel chloride and 70 milliliters of nickel tetracarbonyl. The reaction product is worked up as in Example 1 or 3.

What I claim is:

1. A process for the production of organometallic nickel compounds which contain a cyclopentadienyl radical and carbon monoxide which comprises reacting nickel tetracarbonyl with an alkali metal compound of a cyclopentadiene selected from the group consisting of cyclopentadiene, methyl-cyclopentadiene, and ethyl-cyclopentadiene, said alkali metal being selected from the group consisting of sodium, potassium, and lithium, said reaction being carried out at a temperature of from about room temperature to about 200° C.

2. A process as in claim 1 wherein the reaction is carried out in the presence of an anhydrous nickel salt.

3. A process for the production of compounds selected from the group consisting of di-cyclopentadienyl-dinickel-dicarbonyl, di - (methylcyclopentadienyl) - dinickel - dicarbonyl, and di-(ethylcyclopentadienyl)-dinickel-dicarbonyl which comprises reacting nickel tetracarbonyl with an alkali metal compound of a cyclopentadienyl selected from the group consisting of cyclopentadiene, methylcyclopentadiene, and ethylcyclopentadiene, said alkali metal being selected from the group consisting of sodium, potassium, and lithium wherein said nickel tetracarbonyl is present in an amount from 1 to 3 times the stoichiometrical amount, and wherein said reaction is carried out in the presence of an anhydrous nickel salt selected from the group consisting of nickel chloride, nickel bromide, nickel nitrate, and nickel thiocyanate, said reaction being carried out at a temperature of from about room temperature to about 200° C.

4. A process as in claim 3 wherein the reaction is carried out in the presence of benzene.

5. A process for the production of compounds selected from the group consisting of di-cyclopentadienyl-dinickel-dicarbonyl, di - (methylcyclopentadienyl) - dinickel - dicarbonyl, and di-(ethylcyclopentadienyl)-dinickel-dicarbonyl which comprises reacting nickel tetracarbonyl with an alkali metal compound of a cyclopentadienyl selected from the group consisting of cyclopentadiene, methylcyclopentadiene, and ethylcyclopentadiene, said alkali metal being selected from the group consisting of sodium, potassium, and lithium wherein said nickel tetracarbonyl is present in an amount from 1 to 3 times the stoichiometrical amount, and wherein said reaction is carried out in the presence of an anhydrous nickel salt selected from the group consisting of nickel chloride, nickel bromide, nickel nitrate, and nickel thiocyanate, said reaction temperature being from about 50° to about 150° C.

References Cited in the file of this patent

UNITED STATES PATENTS

| 2,810,736 | Catlin et al. | Oct. 22, 1957 |
| 2,818,416 | Brown et al. | Dec. 31, 1957 |

FOREIGN PATENTS

| 768,354 | Great Britain | Feb. 13, 1957 |

OTHER REFERENCES

Fischer et al.: Zeitschrift für Naturforschung, vol. 10B, pp. 140–143 (1955).

Wilkinson: Jour. Amer. Chem. Soc., vol. 76 (Jan. 5, 1954), pp. 209–211.

Pauson: Quarterly Reviews (1955), pp. 405–406.

Sidgwick: Chemical Elements and Their Compounds, vol II, page 1451 (1950).